United States Patent [19]

Poulallion

[11] Patent Number: 4,981,588
[45] Date of Patent: Jan. 1, 1991

[54] FILTER FOR MAKING COFFEE DRINKS THAT INCLUDES SUPPORTING MEMBERS

[75] Inventor: Jean Poulallion, Paris, France

[73] Assignee: Jacobs Suchard GmbH, Bremen, Fed. Rep. of Germany

[21] Appl. No.: 266,853

[22] Filed: Nov. 3, 1988

Related U.S. Application Data

[63] Continuation of Ser. No. 188,858, May 2, 1988, abandoned.

[30] Foreign Application Priority Data

May 9, 1987 [DE] Fed. Rep. of Germany ....... 3715519

[51] Int. Cl.⁵ .......................................... B01D 29/085
[52] U.S. Cl. .................................... 210/474; 210/478; 210/481; 426/77; 99/295
[58] Field of Search .................... 426/77, 82; 210/473, 210/474, 477, 478, 481, 482; 99/295

[56] References Cited

U.S. PATENT DOCUMENTS

| | | | |
|---|---|---|---|
| 2,728,670 | 12/1955 | Young et al. | 426/82 |
| 3,344,734 | 10/1967 | Aquirre-Batres et al. | 426/82 |
| 3,899,599 | 8/1975 | Rambold | 426/82 |
| 3,971,305 | 7/1976 | Daswick | 426/82 |
| 4,220,541 | 9/1980 | Chang | 210/474 |
| 4,519,911 | 5/1985 | Shimizu | 426/82 |
| 4,560,475 | 12/1985 | Kataoka | 210/474 |
| 4,584,101 | 4/1986 | Kataoka | 426/82 |
| 4,715,271 | 12/1987 | Kitagawa | 426/82 |

Primary Examiner—Richard V. Fisher
Assistant Examiner—Wanda L. Millard
Attorney, Agent, or Firm—Burns, Doane, Swecker & Mathis

[57] ABSTRACT

A filter for making filtered drinks, such as coffee, includes a filter bag and supporting members connected to the filter bag for supporting the filter on the rim of a vessel, such as a cup. The supporting members are adapted to be moved from a flat folded configuration to a position in which the supporting members are substantially horizontally oriented for being positioned on the rim of the cup.

17 Claims, 3 Drawing Sheets

FILTER FOR MAKING COFFEE DRINKS THAT INCLUDES SUPPORTING MEMBERS

This application is a continuation of application Ser. No. 188,858, filed May 2, 1988, now abandoned.

FIELD OF THE INVENTION

The invention relates to a stand-up filter and more particularly, a stand-up filter for making filtered drinks, especially coffee, with a supporting member which can be brought into a supporting position by being unfolded, for support on an edge of a (drinking) vessel, and with an upwardly open filter bag held by the supporting member.

BACKGROUND OF THE INVENTION

Stand-up filters of the type discussed here serve for making filtered drinks, especially coffee drinks, in a simple way. The stand-up filter is intended to be used only once and is adapted to be stood on the edge of a vessel, especially on the edge of a cup. A portion of a substance for making the drink, especially ground roasted coffee, is introduced into the upwardly open filter bag. The drink is made directly by means of (brewing) water poured into the filter bag from above, and the stand-up filter is then discarded as a whole. In the making of coffee drinks, the portion of ground roasted coffee may also be already present in the filter bag as a result of appropriate production.

Simple handling and cost-efficient production are factors to be taken into account in the constructive design of stand-up filters of this type. It is necessary, furthermore, that the stand-up filter which is unfoldable into a three-dimensional shape for the preparation of the drink, can be folded into a flat configuration for packaging. In this storable initial form in which the filter is ready for dispatch, foldable stand-up filters of this type are conventionally packaged in an outer wrapping, especially a foil bag.

The supporting members conventionally consist of thin cardboard (paperboard). It is important to design the supporting members so that they are as small as possible and can likewise be folded together in a flat configuration for packaging, but nevertheless, when unfolded, guarantee that the stand-up filter has sufficient firmness and stability.

OBJECTS AND SUMMARY OF THE INVENTION

One of the objects on which the present invention is based is to design a stand-up filter of the type mentioned above, so that the properties described are put into effect in the best possible way.

To achieve this object, the stand-up filter according to the invention includes at least two supporting members arranged on opposite sides of the filter bag which are pivotable from an initial position resting flat against the filter bag into a (horizontal) supporting position directed transversely relative to the initial position.

In the stand-up filter according to the invention, the supporting members are laid flat against the filter bag in the initial position and, to assume the position of use, are folded transversely relative to the initial position and secured in this supporting position. The stand-up filter can thus be placed with the horizontally directed supporting members on the edge of the vessel, the filter bag open wide at the top projecting into the vessel. The supporting members extend at a distance from the top edge of the filter bag.

According to a further feature of the invention, the filter bag is equipped, in the upper region, with reinforcements arranged all round and consisting especially of cardboard blanks. These are attached, in particular glued or sealed, to the filter bag on the outside. The supporting members located opposite one another are fastened to the reinforcements, specifically to central reinforcements, or with these form a common workpiece. During the unfolding of the filter bag, the frame-like supporting members are folded into a position transverse relative to the reinforcements with lateral regions of the supporting members resting as clamping wings against the side reinforcements (lateral reinforcements) under increased friction and thereby fixing the supporting position of the supporting members. Because the reinforcement is formed from several individual blanks (of cardboard or the like), a polygonal, especially hexagonal, opening form of the filter bag is obtained when the frame-like supporting members are pivoted into the supporting position.

The stand-up filter designed in this way requires only a small amount of material, in particular only the filter bag fabricated from filter paper or the like and relatively small blanks of stabilizing material, fabricated from, for example, cardboard. The stand-up filter can nevertheless be unfolded into a three-dimensional shape especially favourable for handling.

BRIEF DESCRIPTION OF THE DRAWINGS

An exemplary embodiment of the stand-up filter according to the invention is explained in detail below with reference to the drawings in which like members bear like reference numerals and wherein.

DETAILED DESCRIPTION OF THE PREFERRED EMBODIMENT

Figure 1:
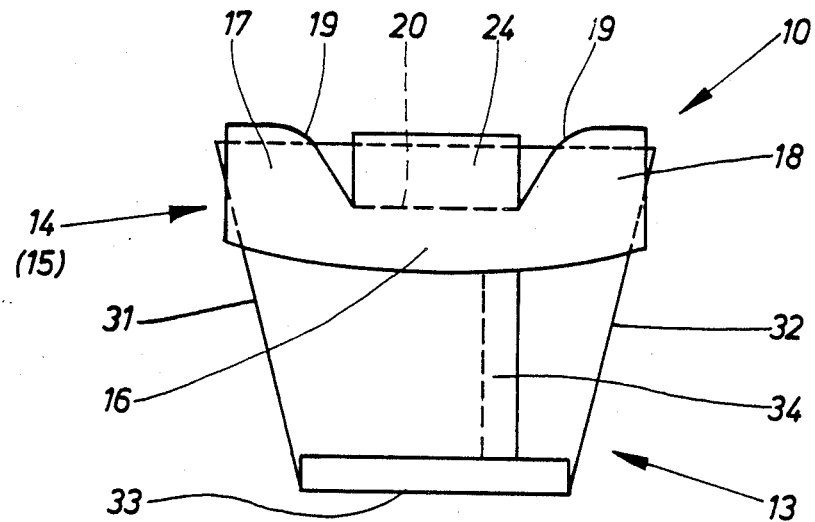
FIG. 1 shows is a side view of a stand-up filter in the initial position and a folded configuration.

The exemplary embodiment of a stand-up filter 10 illustrated in the drawings, is intended and suitable, above all, for preparing coffee drinks directly in small vessels, especially in cups 11. To prepare the drink, the stand-up filter 10 is placed on an upper edge of the vessel, here on a cup edge 12. The stand-up filter 10 consists, in its basic design, of a filter bag 13 hanging down freely into the cup 11 and of members consisting of (thin) cardboard and intended for holding and reinforcing or stiffening the filter bag 13.

Figure 3:
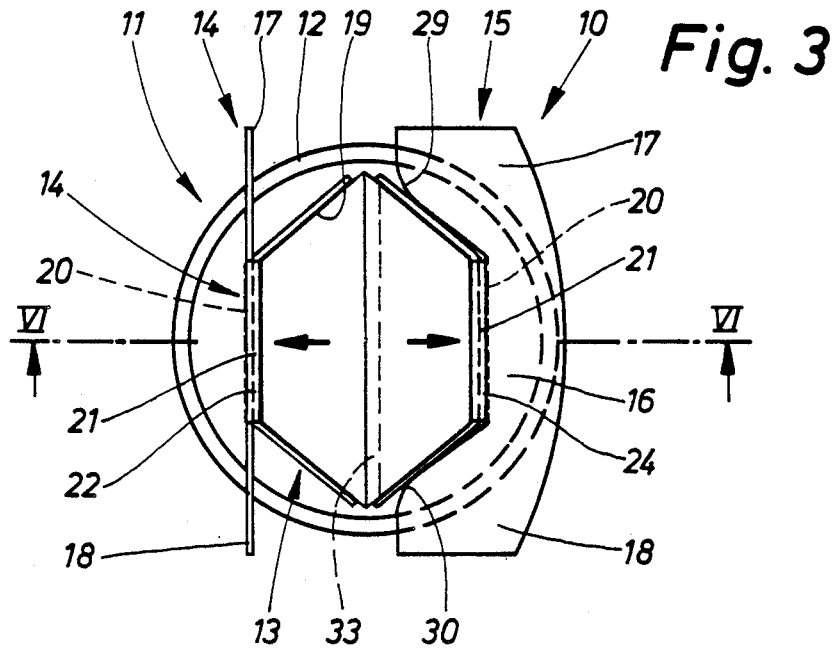
FIG. 3 is a top view of a stand-up filter arranged on a drinking vessel, with the supporting members in different positions.
Figure 4:
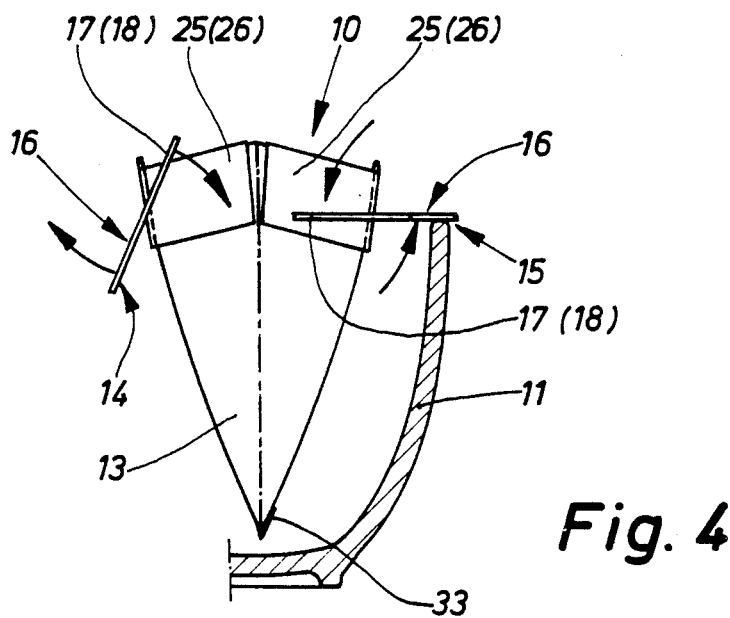
FIG. 4 shows is a front view of the stand-up filter in the partially unfolded position according to FIG. 3.

A supporting member 14, 15 is arranged on each of two mutually opposite sides of the filter bag 13. In the unfolded supporting position (FIG. 3 on the right), these are made frame-like, in particular designed as half-frames each surrounding approximately half the upper region of the filter bag 13. In functional terms, each supporting member 14, 15 consists of a middle part 16 performing the actual supporting or carrying function and of lateral clamping wings 17, 18. The supporting members 14, 15 rest on the cup edge 12 by means of all the abovementioned part.

Figure 2:
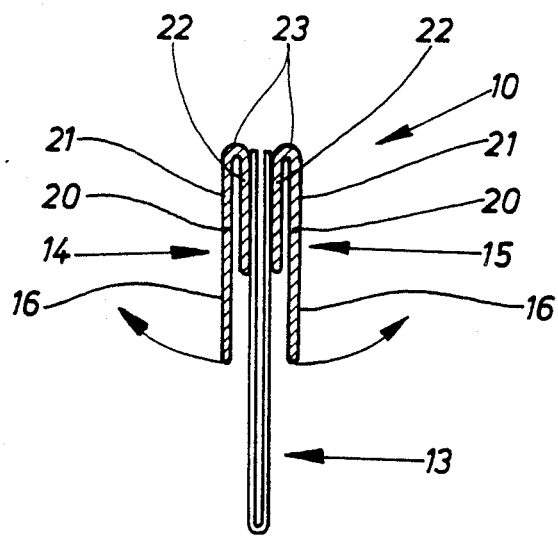
FIG. 2 is a vertical cross-sectional view through the center of the stand-up filter in the position according to FIG. 1.
Figure 5:
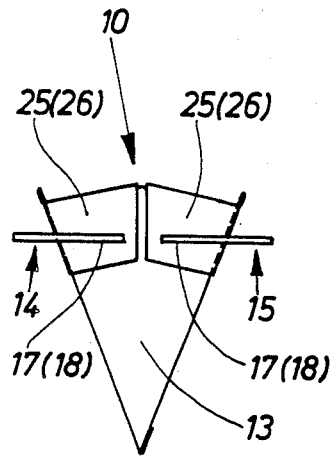
FIG. 5 is a side view of the filter in the unfolded position.
Figure 6:
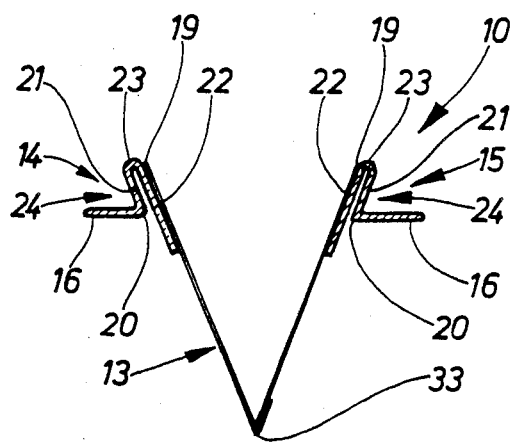
FIG. 6 is a vertical cross-sectional view through an unfolded stand-up filter in the region of the supporting members.

The supporting members 14, 15 are connected pivotably or foldably to the outer face of the filter bag 13 on sides located exactly opposite one another. In the initial position (FIG. 1 or FIG. 2), the supporting members 14, 15 rest flat against mutually opposite sides of the filter bag 13 which is likewise folded together in a flat configuration. A folding line 20 for the supporting member 14, 15 connected to the filter bag 13 extends at a distance from an upper edge 19 of the bag. The supporting member 14, 15 is folded or pivoted about this transverse or horizontal folding line 20 so that the supporting member moves from the position resting flat against the filter bag 13 to the transversely directed supporting position (FIG. 5). The folding line 20 extends only in the region of the middle part 16, whilst the clamping wings 17, 18 are freely movable, without being connected to the filter bag 13.

The supporting member 14, 15 is connected to a reinforcement, namely the central reinforcement 21, likewise arranged on the outer face of the filter bag 13 in the upper region of the latter. This reinforcement is designed as a rectangular blank made especially of thin cardboard, and is glued or sealed to the filter bag 13 preferably over its entire surface. The supporting member 14, 15 is connected to this central reinforcement 21 via the folding line 20, so that the two parts form a common workpiece or punched article. In the exemplary embodiment illustrated, this individual article is designed so that the central reinforcement 21 consists of a wall leg 22 connected directly to the filter bag 13 and of an outer leg 24 connected to the said wall leg 22 via an upper folding edge 23. This outer leg 24 is fastened to the wall leg 22, for example by means of adhesive bonding or welding. The supporting member 14, 15 is connected to the lower edge of the outer leg 24 via the folding line 20. As a result of this construction, the filter bag 13 acquires increased rigidity in the middle region or in the region of articulation of the supporting members 14, 15.

Lateral reinforcements 25 and 26 adjoin the central reinforcement 21 on both sides towards the sides or in the peripheral direction of the filter bag 13. In the present case, these lateral reinforcements are designed as separate approximately rectangular blanks of thin cardboard or the like and are likewise connected to the outer face of the filter bag 13 by means of adhesive bonding or welding. The lateral reinforcements 25, 26 directly adjoin the central reinforcement 21. Joining edges 27 and 28 form folding points for the filter bag 13 in its unfolded position, so that the upper region of the filter bag, in particular the stiffened region, in the unfolded position acquires a polygonal, here hexagonal, cross-sectional form.

The lateral reinforcements 25, 26 are also important for fixing the supporting members 14, 15 in the (horizontal) supporting position. For this purpose, the clamping wings 17, 18 of the supporting members 14, 15 are equipped with arcuate clamping edges 29, 30 which are drawn inwards, as seen in horizontal projection, and which, during the pivoting movement of the supporting members 14, 15 from the position in which the are folded in a flat configuration into the supporting position, slide along on the lateral reinforcements 25, 26 under friction and, when the horizontal supporting position is reached, exert a clamping and consequently holding force on the supporting members 14, 15. The supporting members 14, 15 are thus releasably fixed in the supporting position.

In the present case, the filter bag 13 is designed so as to taper downwards in the manner of a funnel. Lateral folding edges 31, 32 converge to a bottom seam 33. The lateral folding edges 31, 32 make it possible to fold the filter bag into the flat configuration. At the same time, an (imaginary) mid-plane of the stand-up filter 10 extends through the lateral folding edges 31, 32 and divides it into two identical halves. A longitudinal seam 34 of the filter bag 13 is formed in a suitable region between the lateral folding edges 31, 32.

Figure 7:
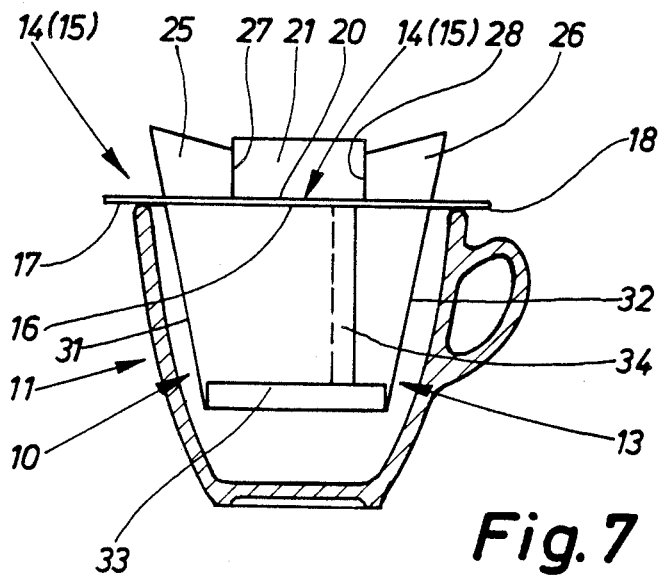
FIG. 7 is a side view, offset 90° relative to FIG. 4, of an unfolded stand-up filter on a drinking vessel.

The dimensions are selected so that, in the infusion position (FIG. 7), the predominant lower region of the filter bag 13 projects into the vessel (cup 11). The strengthenings or reinforcements arranged above the supporting members 14, 15 are located outside the cup 11. The lower region of the filter bag 13 therefore dips into the infusion liquid.

Individual constructional elements can be designed differently. Thus, the lateral reinforcements 25, 26 can, with the central reinforcement 21 and the associated supporting member 14, 15, form a common one-part workpiece with pre-embossed folding edges in the region of the joining edges 27, 28. Also, the filter bag 13 can have a different geometrical form. The reinforcement in the upper region of the filter bag 13, especially the lateral reinforcements 15, 16, can be provided with grooves or slots made by embossing and intended for the positive engagement of the clamping wings 17, 18 in the supporting position of the supporting members 14, 15.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than resctrictive. Variations and changes may be made by others without departing from the spirit of the present invention. Accordingly, it is expressly intended that all such variations and changes which fall within the spirit and scope of the present invention as defined in the claims, be embraced thereby.

What is claimed is:

1. A stand-up filter for making filtered drinks in a vessel having a rim, comprising:
   an upwardly open filter bag;
   at least two supporting members for supporting the filter bag on the vessel;
   means for pivotally connecting each supporting member to the filter bag so that the supporting members can be moved from a folded position in which the supporting members lie substantially flat against the filter bag to an unfolded substantially horizontal supporting position in which the supporting members are adapted to be placed on the rim of the vessel, each of said supporting members being a substantially flat frame that, in the unfolded position, surrounds a portion of the filter bag;

position securing means forming a part of each supporting member for frictionally engaging lateral clamping faces of said filter bag when said supporting members are moved to the substantially horizontal supporting position to thereby secure the supporting members in the substantially horizontal supporting position as a result of the frictional engagement between the position securing means and the lateral clamping faces; and central reinforcement pieces connected to opposite upper regions of the filter bag, said means for pivotally connecting including each of said supporting members being hingedly connected to one of said central reinforcement pieces.

2. The filter according to claim 1, wherein said lateral clamping faces of said filter bag are defined by lateral reinforcement pieces attached to the filter bag at positions adjoining the central reinforcement pieces.

3. The filter according to claim 2, wherein said lateral reinforcement pieces are formed as separate pieces from cardboard.

4. The filter according to claim 2, including joining edges formed between each central reinforcement piece and the adjoining lateral reinforcement pieces, said joining edges forming folding points for the filter bag such that the upper region of the filter bag defines a polygonal shape when unfolded.

5. The filter according to claim 1, wherein each of said central reinforcement pieces and the supporting member to which the central reinforcement piece is attached are formed as one piece from cardboard.

6. A stand-up filter for making filtered drinks in a vessel having a rim, comprising:
an upwardly open filter bag;
at least two supporting members for supporting the filter bag on the vessel;
means for pivotally connecting each supporting member to the filter bag so that the supporting members can be moved from a folded position in which the supporting members lie substantially flat against the filter bag to an unfolded substantially horizontal supporting position in which the supporting members are adapted to be placed on the rim of the vessel;
position securing means forming a part of each supporting member for frictionally engaging lateral clamping faces of said filter bag when said supporting members are moved to the substantially horizontal supporting position to thereby secure the supporting members in the substantially horizontal supporting position as a result of the frictional engagement between the position securing means and the lateral clamping faces; and
a central reinforcement piece connected to opposite upper regions of the filter bag, said means for pivotally connecting including each of said supporting members being hingedly connected to one of said central reinforcement pieces.

7. The filter according to claim 6, wherein said lateral clamping faces of said filter bag are defined by lateral reinforcement pieces attached to the filter bag at positions adjoining the central reinforcement pieces.

8. The filter according to claim 7, wherein said lateral reinforcement pieces are formed as separate pieces from cardboard.

9. The filter according to claim 7, including joining edges formed between each central reinforcement piece and the adjoining lateral reinforcement pieces, said joining edges forming folding points for the filter bag such that the upper region of the filter bag defines a polygonal shape when unfolded.

10. The filter according to claim 6, wherein each of said central reinforcement pieces and the supporting member to which the central reinforcement piece is attached are fabricated as a single piece from cardboard.

11. A stand-up filter for making filtered drinks in a vessel, comprising:
an upwardly open filter bag; and
at least two supporting members hingedly connected to opposite sides of said filter bag for supporting the filter bag on the vessel, said supporting members being hingedly connected to the filter bag so that said supporting members can be moved from a folded position in which the supporting members lie substantially flat against the filter bag to an unfolded substantially horizontal supporting position in which the supporting members are adapted to be positioned on a rim of the vessel, each of said supporting members including spaced apart lateral clamping wings that frictionally engage lateral clamping faces of the filter bag when the supporting members are moved to the substantially horizontal position such that the supporting members are secured in the substantially horizontal position as a result of the frictional engagement between the lateral clamping faces and the lateral clamping wings.

12. The filter according to claim 11, including central reinforcing pieces attached to opposite sides of said filter bag.

13. The filter according to claim 12, wherein said lateral clamping faces of said filter bag are defined by lateral reinforcement pieces attached to the filter bag at positions adjoining the central reinforcement pieces.

14. The filter according to claim 13, including joining edges formed between each central reinforcement piece and the adjoining lateral reinforcement pieces, said joining edges forming folding points for the filter bag such that the upper region of the filter bag defines a polygonal shape when unfolded.

15. The filter according to claim 12, wherein each of said supporting members include a middle part positioned between the spaced apart lateral clamping wings, the hinged connection between the supporting members and the filter bag being defined by the middle part of each supporting member being hingedly connected to one of said central reinforcing pieces.

16. The filter according to claim 11, wherein said lateral clamping wings include arcuate edges that frictionally engage the lateral clamping faces.

17. The filter according to claim 11, wherein each of said supporting members includes a substantially flat frame that surrounds a portion of the filter bag when the supporting member is in the substantially horizontal position.

* * * * *